(12) United States Patent
Liu et al.

(10) Patent No.: US 7,870,124 B2
(45) Date of Patent: Jan. 11, 2011

(54) REWRITING NODE REFERENCE-BASED XQUERY USING SQL/SML

(75) Inventors: Zhen Hua Liu, San Mateo, CA (US); Hui Joe Chang, Fremont, CA (US); James W. Warner, South San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 445 days.

(21) Appl. No.: 11/955,944

(22) Filed: Dec. 13, 2007

(65) Prior Publication Data

US 2009/0157722 A1 Jun. 18, 2009

(51) Int. Cl.
*G06F 17/30* (2006.01)

(52) U.S. Cl. ............. 707/718; 707/713; 707/759; 707/739

(58) Field of Classification Search ......... 707/705–780
See application file for complete search history.

(56) References Cited

U.S. PATENT DOCUMENTS

| | | | | |
|---|---|---|---|---|
| 6,636,845 | B2 * | 10/2003 | Chau et al. ................... | 1/1 |
| 6,934,712 | B2 * | 8/2005 | Kiernan et al. ............... | 1/1 |
| 7,120,645 | B2 * | 10/2006 | Manikutty et al. ........... | 1/1 |
| 7,171,404 | B2 * | 1/2007 | Lindblad et al. ............. | 1/1 |
| 7,315,852 | B2 * | 1/2008 | Balmin et al. .......... | 707/715 |
| 7,346,609 | B2 * | 3/2008 | Chen et al. ................... | 1/1 |
| 7,392,239 | B2 * | 6/2008 | Fontoura et al. ............. | 1/1 |
| 7,398,265 | B2 * | 7/2008 | Thusoo et al. ............... | 1/1 |
| 7,472,108 | B2 * | 12/2008 | Lim et al. .................... | 1/1 |
| 7,519,577 | B2 * | 4/2009 | Brundage et al. ............ | 1/1 |
| 7,693,812 | B2 * | 4/2010 | Lim et al. .................... | 1/1 |
| 7,716,210 | B2 * | 5/2010 | Ozcan et al. ............ | 707/713 |
| 2004/0064466 | A1 * | 4/2004 | Manikutty et al. ...... | 707/100 |
| 2004/0205082 | A1 * | 10/2004 | Fontoura et al. ........ | 707/101 |
| 2005/0097084 | A1 * | 5/2005 | Balmin et al. ............ | 707/3 |
| 2005/0289125 | A1 * | 12/2005 | Liu et al. .................. | 707/3 |
| 2006/0031233 | A1 * | 2/2006 | Liu et al. ................ | 707/100 |
| 2008/0215542 | A1 * | 9/2008 | Lim et al. ................. | 707/3 |

OTHER PUBLICATIONS

Liu, Zhen Hua, et al. "Native XQuary Processing in Oracle XMLDB", SIGMOD 2005, Jun. 14-16, 2005, Baltimore, Maryland, ACM.*

(Continued)

*Primary Examiner*—Tim T. Vo
*Assistant Examiner*—Michelle Owyang
(74) *Attorney, Agent, or Firm*—Hickman Palermo Truong & Becker LLP; Christian A. Nicholes; Daniel D. Ledesma

(57) ABSTRACT

Techniques for processing reference-based SQL/XML operators are provided. Instead of extracting copies of one or more nodes from XML data, a reference-based operator returns a reference to a node. Such a reference is used to determine, for example, whether the corresponding node comes logical before, after, or is the same as another node. An SQL/XML query that includes a reference-based operator may be the original query, or may be generated (e.g., rewritten) from a non-SQL/XML query, such as an XQuery query. One or more physical rewrites may be performed on the SQL/XML query, depending on how the XML data is stored and/or whether an XML index exists for the XML data.

24 Claims, 6 Drawing Sheets

OTHER PUBLICATIONS

Leontiev, Yuri, et al., "On Type Systems for Object-Oriented Database Programming Languages", ACM computing surveys, vol. 34, No. 4, Dec. 2002, 41 pages.

Liu, Z. et al., "Native XQuery Processing in Oracle XMLDB" downloaded Jan. 2, 2008 from the Internet <http://www.oracle.com/technology/tech/xml/xquery/pdf/114_xquery_sigmod2005-final.pdf> 8 pages.

Choi, B. et al., "The XQuery Formal Semantics: A Foundation for Implementation and Optimization" downloaded Jan. 2, 2008 from the Internet <http://www-db.research.bell-labs.com/user/simeon/xquery-optim-planx.pdf> 15 pages.

XQuery 1.0 and XPath 2.0 Data Model downloaded Jan. 2, 2008 from the Internet <http://www.w3.org/TR/2001/WD-query-datamodel-20010607/> pp. 8-20.

U.S. Appl. No. 11/777,132, filed Jul. 12, 2007, Office Action, Mailing Date, Jan. 11, 2010.

* cited by examiner

REWRITING NODE REFERENCE-BASED XQUERY USING SQL/SML

RELATED APPLICATIONS

This application is related to U.S. patent application Ser. No. 10/948,523, entitled "EFFICIENT EVALUATION OF QUERIES USING TRANSLATION", filed by Zhen Hua Liu et al. on Sep. 22, 2004, the entire contents of which is hereby incorporated by reference for all purposes as if fully set forth herein.

FIELD OF THE INVENTION

The present invention relates to processing XML queries that include reference-based semantics.

BACKGROUND

XML is a versatile markup language, capable of labeling the information content of diverse data sources including structured and semi-structured documents, relational databases, and object repositories. A query language that uses the structure of XML intelligently can express queries across all these kinds of data, whether physically stored in XML or viewed as XML via middleware. As increasing amounts of information are stored, exchanged, and presented using XML, the ability to query XML data sources intelligently becomes increasingly important. One of the great strengths of XML is its flexibility in representing many different kinds of information from diverse sources. To exploit this flexibility, an XML query language should provide features for retrieving and interpreting information from these diverse sources.

The XQuery query language is designed to query collections of XML data. XQuery is semantically similar to SQL. XQuery 1.0 was developed by the XML Query working group of the W3C. XQuery 1.0 became a W3C Recommendation on Jan. 23, 2007 and is described in http://www.w3.org/TR/xquery/. The contents of the Recommendation are incorporated by this reference for all purposes as if fully disclosed herein. XQuery is designed to be a language in which queries are concise and easily understood. XQuery is also flexible enough to query a broad spectrum of XML information sources, including both databases and documents. XQuery operates on the abstract, logical structure (i.e., the data model) of an XML document, rather than its surface syntax. An XQuery expression may comprise multiple expressions (i.e., sub-expressions).

SQL/XML is a query language that is an extension to the SQL standard. SQL/XML is defined by ISO/IEC 9075-14: 2003 and specifies SQL-based extensions for using XML in conjunction with SQL. SQL/XML introduces the XML data type, as well as several routines, functions, and XML-to-SQL data type mappings to support manipulation and storage of XML in a database that supports SQL.

XQuery and SQL/XML share many common concepts and constructs, such as join, predicates, an order-by clause, and projection. For example, projection in XQuery is specified by a return clause and projection in SQL/XML is specified in a select clause.

Currently, SQL/XML engines, such as the SQL/XML engine provided by Oracle 10 g, have been developed and optimized to process (e.g., rewrite) SQL/XML queries in order to generate efficient execution plans. For example, an SQL/XML engine might determine that an XML index may be used to execute a portion of an SQL/XML query and, accordingly, rewrite the query to specify the XML index.

Therefore, the fact that XQuery and SQL/XML share many common constructs facilitates rewriting XQuery constructs into SQL/XML constructs.

The following query is an example XQuery query:

```
for $i in ora:view("Tab")
where $i/PurchaseOrder/PONumber = 45
orderby $i/PurchaseOrder/PODate
return <newPO> {$i/PurchaseOrder/POItem} </newPO>
``` where ora:view("Tab") returns table "Tab" that contains Purchase Order documents and where "PO" is shorthand for "PurchaseOrder." The above XQuery query may be rewritten into the following SQL/XML query:

```
select XQextract("newPO", value(t), '/PurchaseOrder/POItem')
from Tab t
where XQgetValue(value(t), '/PurchaseOrder/PONumber') = 45
orderby XQgetValue(value(t), '/PurchaseOrder/PODate')
```

The XQextract( ) operator returns a copy of the node "/PurchaseOrder/POItem" and surrounds the copy with the tag "<newPO>." Because XQuery queries can be rewritten to SQL/XML queries, XQuery queries can take advantage (indirectly) of existing SQL/XML engines.

However, SQL/XML engines are essentially value-based systems and some XQuery queries are referenced-based. Some XQuery constructs, such as node comparison operators, operate on a tree-based data model where each node in an XQuery data model sequence is semantically a reference to a node of the tree. Examples of node operators include IS, <<, >>, UNION, INTERSECT, and EXCEPT.

Currently, SQL/XML engines do not rewrite XQuery queries that rely on node reference semantics. Thus, XQuery queries that involve node identity comparisons, such as IS, <<, >>, UNION, INTERSECT, and EXCEPT, must be processed by a coprocessor outside of the SQL/XML engine and, thus, cannot take advantage of SQL/XML engines.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Processing a query involves at least two phases: a compilation phase and an execution phase. The compilation phase may comprise multiple sub-phases. In one sub-phase, a non-SQL/XML query (e.g., an XQuery query) that includes one or more referenced-based semantics is rewritten to include a referenced-based SQL/XML operator. The reference-based SQL/XML operator, when executed, extracts a reference to XML data (e.g., for subsequent comparison with other such references) instead of the XML data itself.

In another sub-phase, the rewritten query may be further rewritten depending on how the underlying XML data is stored. Thus, the referenced-based SQL/XML operator may be further rewritten to reference one or more database structures (e.g., an XML index or one or more non-index tables) that store reference-based information about the underlying XML data.

Thus, according to certain embodiments of the invention, XML queries that rely on referenced-based semantics can be rewritten into SQL/XML constructs which may then be processed by an SQL/XML engine.

Although the following description refers to XQuery queries being rewritten to include a reference-based SQL/XML operator, embodiments of the invention are not so limited. An original query may conform to a query language other than XQuery, as long as the query includes reference-based semantics. Alternatively, the original query received by a database server may be an SQL/XML query that includes a reference-based operator. For example, a database user can specify such an SQL/XML query.

Value-Based Semantics Versus Reference-Based Semantics

Figure 1:
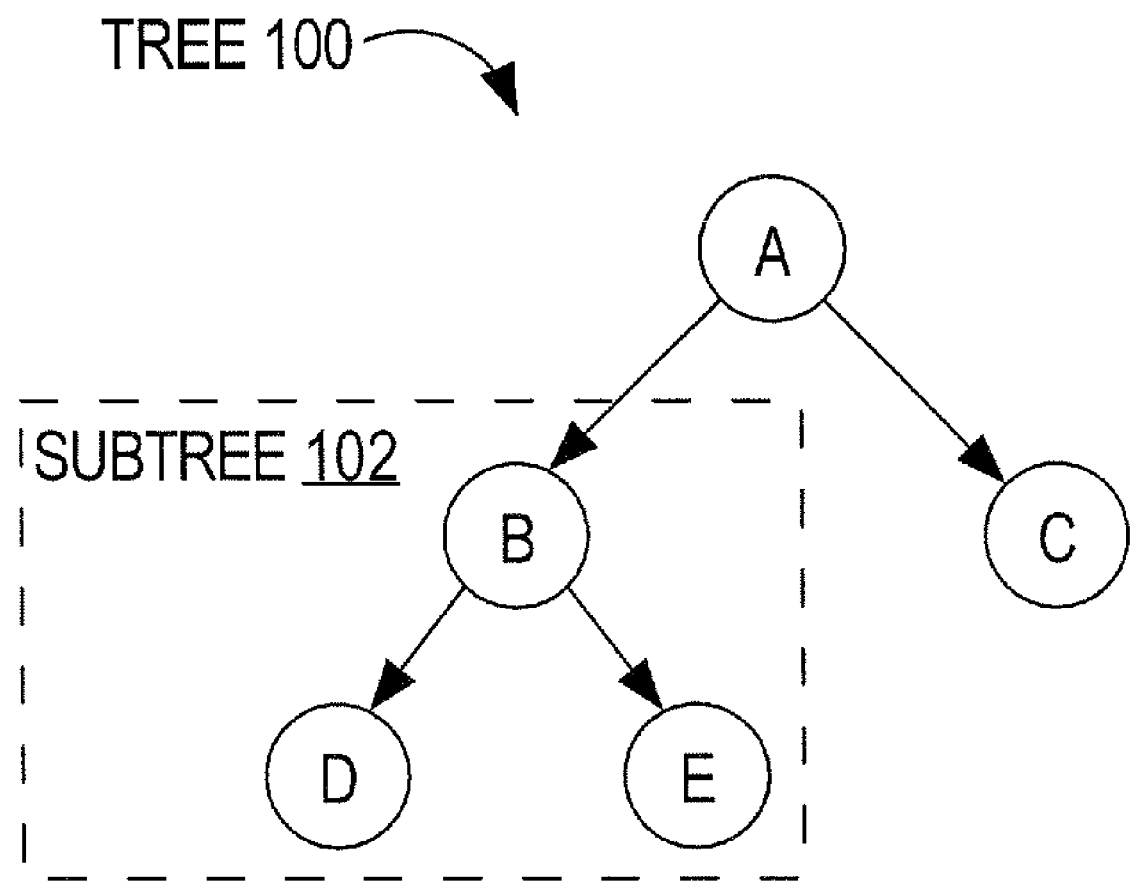
FIG. 1 is a block diagram that depicts a node tree based on an example XML document.

As described previously, operators that are processed by SQL/XML engines are value-based, not referenced-based. FIG. 1 is a block diagram that depicts a node tree 100 based on an example XML document. In response to executing the following SQL/XML operator XQextract(x, '/A/B'), an SQL/XML engine returns a value. In this example, the value is a copy of subtree 102. Because a copy of subtree 102 is returned rather than a reference to original subtree 102, the SQL/XML engine is "value-based" rather than "reference-based." Subtree 102 is rooted at node B. However, based on the returned copy, the SQL/XML engine cannot operate on, or even locate, ancestor nodes or sibling nodes of node B. For example, the SQL/XML engine cannot determine whether node B comes before or after node C in the XML document. Furthermore, the SQL/XML engine cannot compare two separately-referenced nodes and always accurately determine whether the two nodes are the same node. For example, two separately-referenced nodes may have the same values but be different fragments of the same XML document or of different XML documents. Thus, the values that are returned from existing extract operators are effectively "taken out of context."

According to an embodiment of the invention, an SQL/XML engine is extended to include support for one or more reference-based SQL/XML operators and functions. An example of such a reference-based operator is referred to herein as XQextractRef( ). The XQextractRef( ) operator takes as input a path expression and returns a reference, either a physical reference or a logical reference, depending on how the underlying XML data is stored. For example, given tree 100 of FIG. 1, executing XQextractRef(x, '/A/B') returns a reference to node B. For purposes of brevity, the following description refers to "XQextractRef( ) operator" (or simply "XQextractRef( )") in place of "a reference-based SQL/XML operator."

In an embodiment, when executed, XQextractRef( ) causes data, that includes header information and a payload, to be returned. The header information may indicate (a) that the payload is an XML type, (b) that the payload is a reference (rather than a value), and (c) the type of reference. The payload includes the actual reference to a node. Non-limiting examples of types of references include a node identifier, an order key value, a preorder traversal value, or a locator value that indicates a position where the node is located in storage.

Another example of a reference-based SQL/XML operator is XQnodeCmp( ). The XQnodeCmp( ) operator is a three-logic operator that takes two references as input and returns a '−1', '0', or '1'. For example, given tree 100 of FIG. 1, execution of XQnodeCmp(XQextractRef(x, '/A/B'), XQextractRef(x, '/A/C')) returns '−1', indicating that node B is before node C. A '0' return value indicates that the node referenced by the first argument and the node referenced by the second argument are the same node. A '1' return value indicates that the node referenced by the first argument is after the node referenced by the second argument.

Non-limiting examples of reference-based operators and functions that an XQuery statement may specify include context node traversal operators (e.g., reverse axes and sibling axes), node comparison operators (e.g., IS, <<, and >>), sequence operators (e.g., UNION, INTERSECT, EXCEPT), fn:root( ), fn:document-uri( ), fn:base-uri( ), fn:resolve-QName($2^{nd}$ argument), fn:inscope-prefixes( ), fn:namespace-uri-for-prefix($2^{nd}$ argument). Such operators and functions are rewritten with the XQextractRef( ) operator and/or the XQnodeCmp( ) operator.

Because many optimizations have been developed for SQL/XML engines for value-based constructs, in an embodiment, one or more reference-based SQL/XML operators are used only when rewriting an XQuery query that includes one or more reference-based semantics.

Logical Rewrite Phase

Extracting references to nodes from XML documents, in some situations, is more expensive than extracting values from XML documents, especially when the XML documents are shredded into pieces. In such a case, in order to extract the required reference(s), one or more XML trees (or at least large portions of the tree) are generated from one or more XML documents. Generating an XML tree is a relatively expensive operation and is avoided if possible. Therefore, even though correct results may be obtained by extracting references instead of values, in an embodiment, references are extracted only when the semantics of the original query require references.

In an embodiment, before a reference-based SQL/XML operator is used, an XQuery query passes through a logical rewrite phase. In the logical rewrite phase, an XQuery expression tree (XET) analyzer determines whether the operator should be used. One way to perform this determination is to generate an expression tree from the XQuery query. The XET analyzer analyzes each node in an expression tree to determine whether the node and/or the node's children require a reference (because the operator represented by the node cannot guarantee an accurate result if the operands represented by the node's children are values, for example) and, thus, an insertion of an XQextractRef( ) operator in a subsequently-rewritten query. The determination may be made by comparing an operator, represented by a node in an expression tree, with a list of known operators that require references.

Figure 2A:
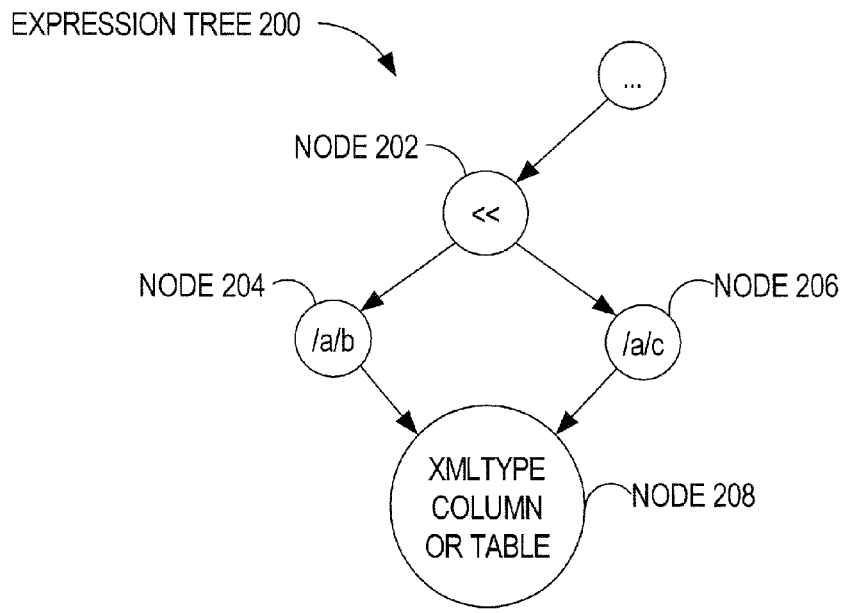
FIGS. 2A-B are block diagrams that depict expression trees based on portions of example XQuery queries, according to an embodiment of the invention.

FIG. 2A is a block diagram that depicts a portion of an example expression tree 200 based on the following portion of an XQuery query: "/a/b<</a/c". The result of executing this portion indicates whether the node at '/a/b' is before the node at '/a/c'.

As depicted in FIG. 2, a node 202 is created for the comparative operator '<<' and a node is created for each path expression (i.e., nodes 204 and 206). A node 208 is also created for an XMLType column or table in which the XML data (corresponding to '/a/b' and '/a/c') is stored. Expression tree 200 is traversed beginning, e.g., at a leaf node in expression tree 200.

For example, the XET analyzer begins at node 208 and determines that node 208 does not require a reference (i.e., a value is sufficient). The XET analyzer then analyzes node 204 (or node 206) and determines that node 204 also does not require a reference. If node 204 included a reverse (or parent) axis or a sibling axis operation, then the XET analyzer would "mark" node 204 as requiring a reference (or otherwise indicate that node 204 requires a reference). The XET analyzer then analyzes node 202. Alternatively, the XET analyzer may analyze each parent node of node 208 before analyzing a grandparent node of node 208. The XET analyzer eventually determines that node 202 represents an XQuery operator (i.e., '<<') that requires references as input (because the << operator might not be able to return an accurate result if applied to values rather than references). In response to this determination, the XET analyzer "marks" nodes 204 and 206 as requiring the XQextractRef( ) operator.

Figure 2B:
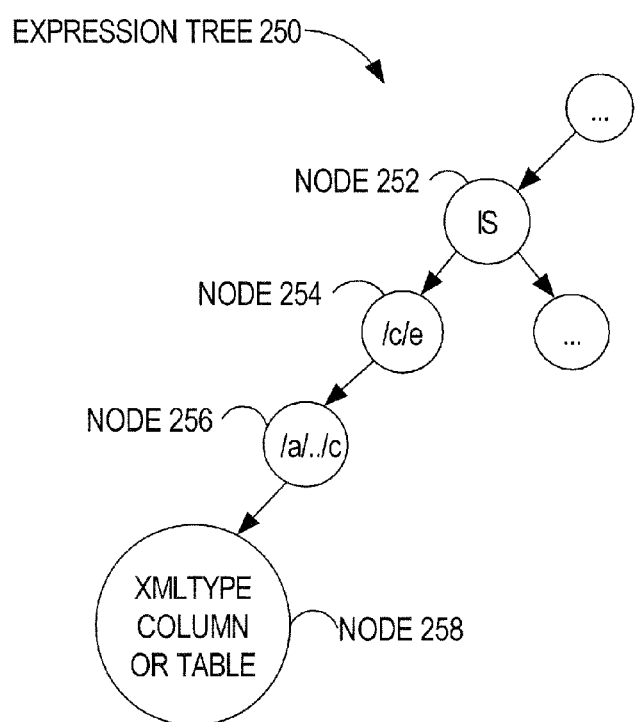

FIG. 2B is a block diagram that depicts a portion of an example expression tree 250. In this example, an XET analyzer analyzes a node 258 (corresponding to an XMLType column or table) and determines that a reference is not required. The XET analyzer then analyzes a node 256 (corresponding to path expression '/a/../c') and determines that a reference is required because the path expression includes a parent axis operation. The XET analyzer marks node 256, which mark is used for rewriting the XQuery query. The XET analyzer then analyzes node 254 and determines that a reference is not required. The XET analyzer then analyzes node 252 and determines that the operator represented by node 252 (i.e., 'IS') requires references as input. As a result of this determination, the XET analyzer marks at least node 254 as requiring a reference.

Figure 3:
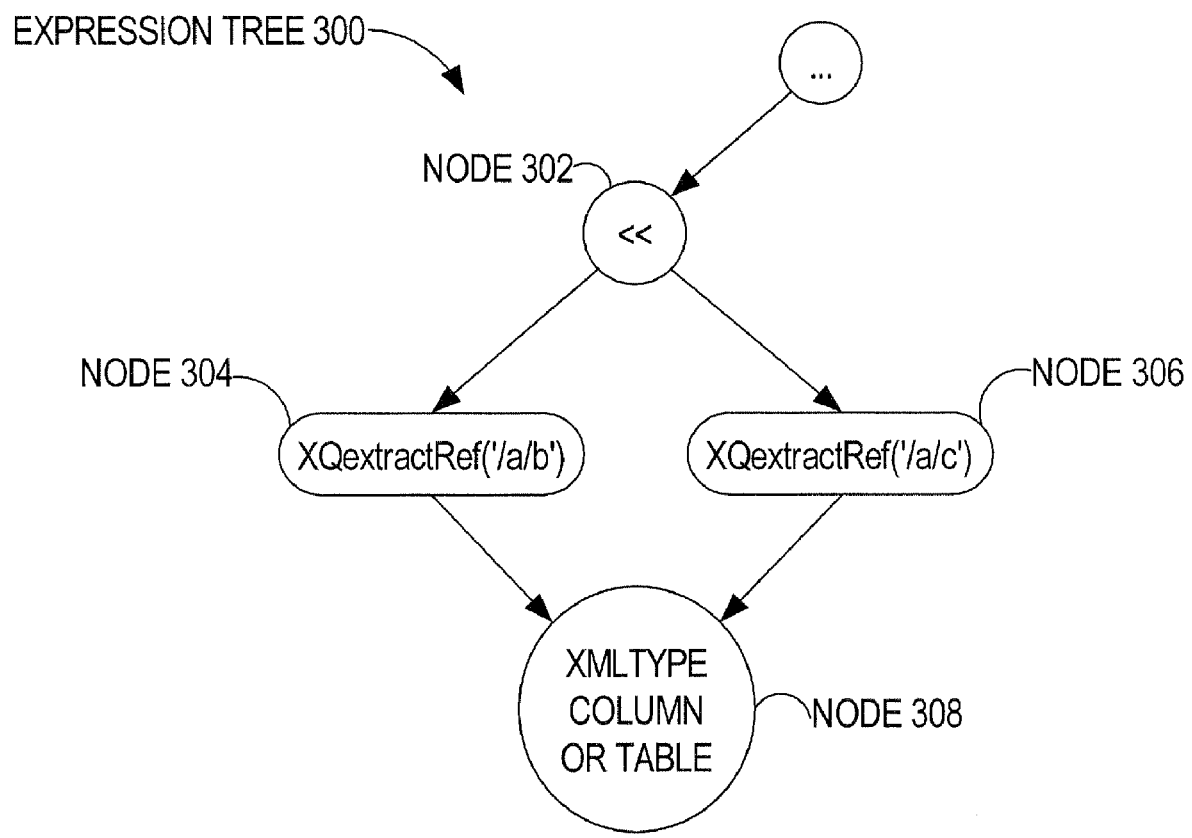
FIG. 3 is a block diagram that depicts a rewritten expression tree based on a portion of an example XQuery query, according to an embodiment of the invention.

After the appropriate nodes in an expression tree are marked as requiring references, a new tree is generated (or the existing expression tree is modified) that includes nodes for the XQextractRef( ) operator. The resulting SQL/XML tree is referred to as a "rewritten expression tree." FIG. 3 is a block diagram that depicts a rewritten expression tree 300 that is based on expression tree 200, according to an embodiment of the invention. Expression tree 300 includes nodes 302-308. Node 304 represents an XQextractRef( ) operator whose input is the path expression '/a/b'. Similarly, node 306 represents an XQextractRef( ) operator whose input is the path expression '/a/c'.

Physical Rewrite Phase

XML data may be stored using various storage models, such as a structured storage model (e.g., object-relational (O-R)), an unstructured storage model (e.g., character large object (CLOB) or binary XML (e.g., CSX)), or tree-based. Thus, after a logical rewrite phase, a compiler determines how to further rewrite a rewritten query. This further rewrite depends on how the underlying XML data is stored.

Therefore, according to an embodiment of the invention, after an original expression tree is rewritten with the XQextractRef( ) operator, the rewritten expression tree then passes through a physical rewrite phase. In the physical rewrite phase, an SQL/XML expression tree (SET) analyzer determines whether to rewrite the XQextractRef( ) operator in order to take advantage of existing data structures on the XML data (e.g., indexes on the XML data or ordered collection table with index arrays). If an index, array, or other existing data structure cannot be used to extract a reference, then one or more XML trees typically are generated from the XML data, which generation is an "expensive" operation in terms of time and resources (including CPU and storage).

Figure 4A:
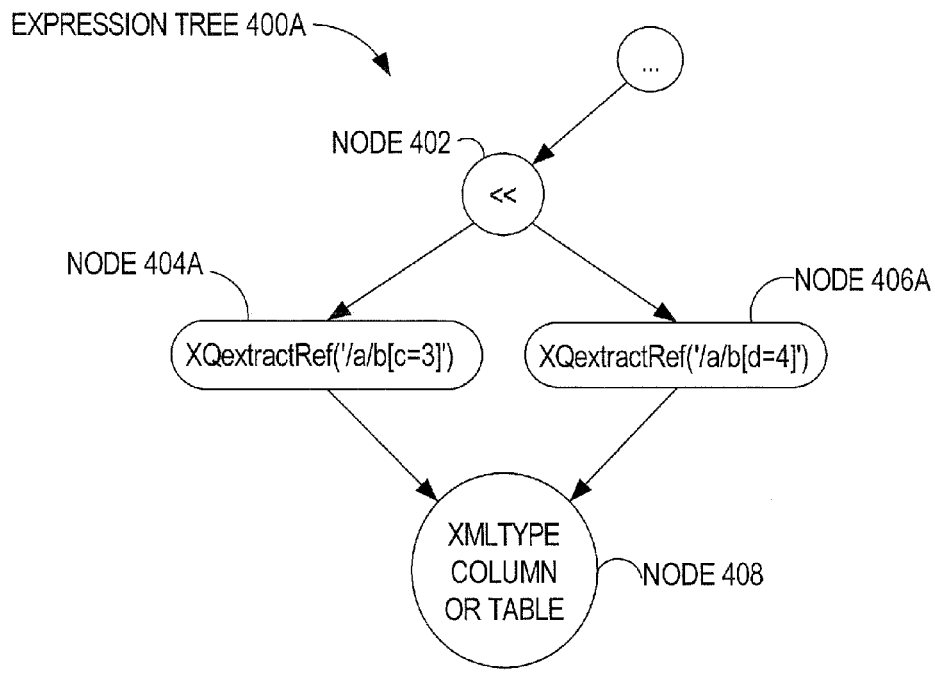
FIGS. 4A and 5A are block diagrams that depict SQL/XML expression trees based on portions of example XQuery queries, according to an embodiment of the invention.

FIG. 4A is a block diagram that depicts a rewritten expression tree 400A, which is a result of a logical rewrite phase. Rewritten expression tree 400A is based on the following portion of an example XQuery query: "/a/b[c=3]<</a/b[d=4]".

XML Index Optimization

In the example of FIG. 4A, during a physical rewrite phase, a SET analyzer analyzes rewritten expression tree 400 and determines that an XML index exists for the XML data in the XMLType column or table represented by node 408. Embodiments of the invention are not limited to any particular implementation of an XML index. An example of an XML index is described in U.S. patent application Ser. No. 10/884,311, entitled INDEX FOR ACCESSING XML DATA, filed on Jul. 2, 2004 by Sivasankaran Chandrasekar et al., and incorporated by reference as if fully set forth herein. An XML index is typically built on unstructured XML data storage (e.g., CLOB) and binary XML data storage (e.g., CSX).

Based on the determination that an XML index is available for the XML data in the XMLType column or table represented by node 408, the SET analyzer analyzes the "parent nodes" of node 408 (i.e., nodes 404A and 406A) to identify any extract operators, whether value-based or reference-based. Because nodes 404A and 406A represent XQextractRef( ) operators, the SET analyzer rewrites nodes 404A and 406A into, respectively, nodes 404B and 406B.

The XML index described in the above-referenced application includes a path table that comprises at least the following columns: row_id, path_id, R_id, order_key, locator, and value. Each row corresponds to a different indexed node of an XML document. The path table may store nodes from multiple XML documents. The row_id column stores a unique identifier for each row in the path table. The path_id column stores identifiers that are unique for the path expressions of the corresponding nodes. The R_id column stores row identifiers of rows in a base table in which the corresponding XML document (i.e., that includes the corresponding nodes) is stored.

The order_key column stores order key values for the corresponding nodes relative to other nodes in the same XML document. An order key value represents the hierarchical position of a node within a document. An order key value may be used as a reference that may be compared to other order key values in order to determine sameness and/or order, as in the present example. Examples of order key values are described in U.S. patent application Ser. No. 10/884,311, entitled INDEX FOR ACCESSING XML DATA, filed on Jul. 2, 2004, which is incorporated by reference as if fully disclosed herein.

The locator column may store information that is used to locate the XML fragments, of the corresponding nodes, in the base table. The value column stores a value for corresponding nodes that are simple elements.

Figure 4B:
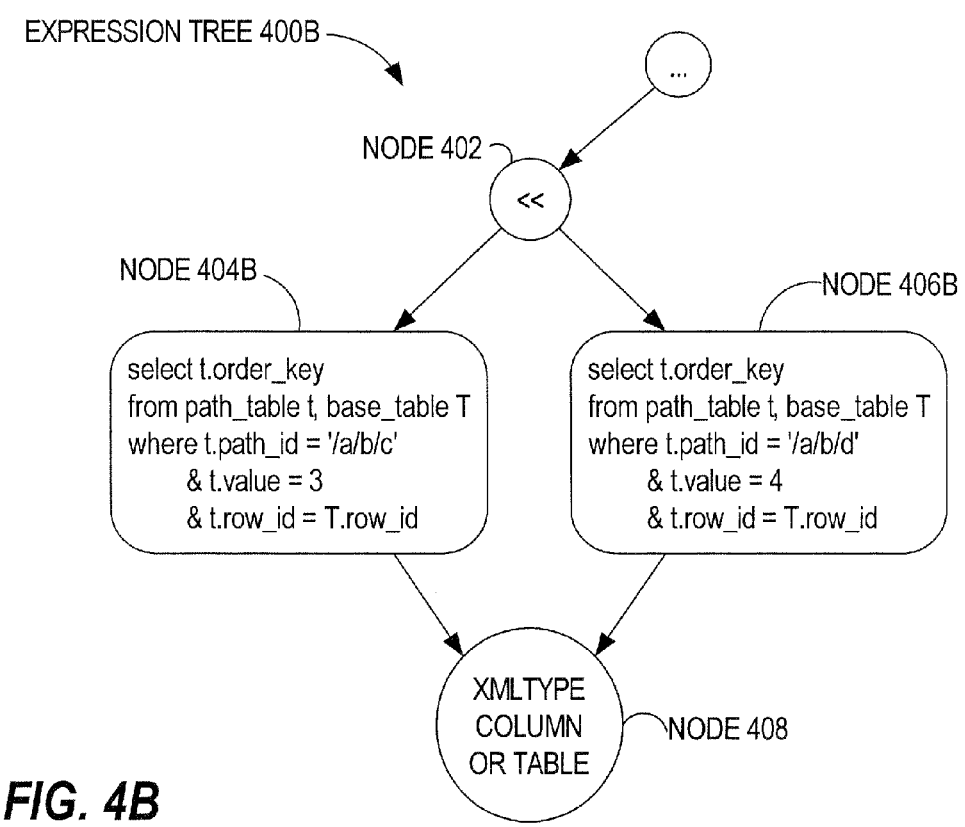
FIGS. 4B and 5B are block diagrams that depict rewritten SQL/XML expression trees based on SQL/XML expression trees of FIGS. 4A and 5A, respectively, according to an embodiment of the invention.

Therefore, as depicted in FIGS. 4A-B, the SET analyzer translates XQextractRef('/a/b[c=3]') into:

```
select t.order_key
from path_table t, base_table T
where t.path_id = '/a/b/c'
    & t.value = 3
    & t.row_id = T.row_id;
``` and XQextractRef('/a/b[d=4]') into:

```
select t.order_key
from path_table t, base_table T
where t.path_id = '/a/b/d'
    & t.value = 4
    & t.row_id = T.row_id;
```

Thus, after passing through a physical rewrite phase, rewritten expression tree 400A becomes expression tree 400B.

O-R Optimization

As mentioned above, XML data may be stored in object-relational (O-R) storage. O-R data structures are typically tables or two-dimensional arrays. In typical O-R storage, a table is generated for each element (or each "significant" element) in an XML document. Columns in a table correspond to attributes of the corresponding XML element.

The following table 100 is an example of a line item table that is associated with a purchase order table. A purchase order typically includes multiple line items. A line item element contains at least two attributes: price and quantity. Therefore, table 100 includes columns Price and Quantity.

TABLE 100

| Array_index | Price | Quantity |
|---|---|---|
| 1 | 45 | 9 |
| 2 | 30 | 150 |
| 3 | 60 | 27 |
| 4 | 130 | 300 |
| 5 | 95 | 4 |

Table 100 also includes an Array Index column. Like the order key value described previously, an array index value is not necessarily specified in an XML document. An array index value may be generated, determined, and assigned to each line item when the XML document, to which the line item originates, is "shredded" and stored in O-R storage.

Figure 5A:
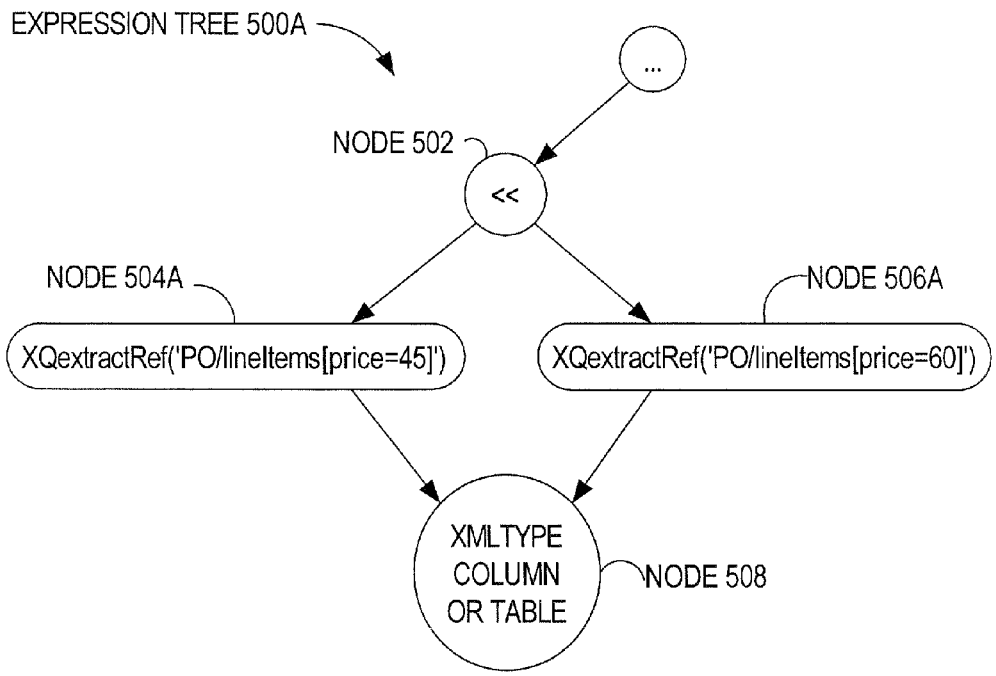

FIG. 5A is a block diagram that depicts a rewritten expression tree 500A, which is a result of a logical rewrite phase. Rewritten expression tree 500A is based on the following portion of an example XQuery query: "/PO/lineItems [price=45]<<PO/lineItems[price=60]".

In the example of FIG. 5A, during a physical rewrite phase, a SET analyzer analyzes rewritten expression tree 500 and determines that the XML data, in the XMLType column or table represented by node 508, is stored in O-R storage. Embodiments of the invention are not limited to any particular implementation of O-R storage.

Based on the determination that the XML data is stored in O-R storage, the SET analyzer analyzes the "parent nodes" of node 508 (i.e., nodes 504A and 506A) to identify any extract operators (whether value-based or reference-based). Because nodes 504A and 506A represent extract operators, the SET analyzer rewrites nodes 504A and 506A into, respectively, 504B and 506B.

Figure 5B:
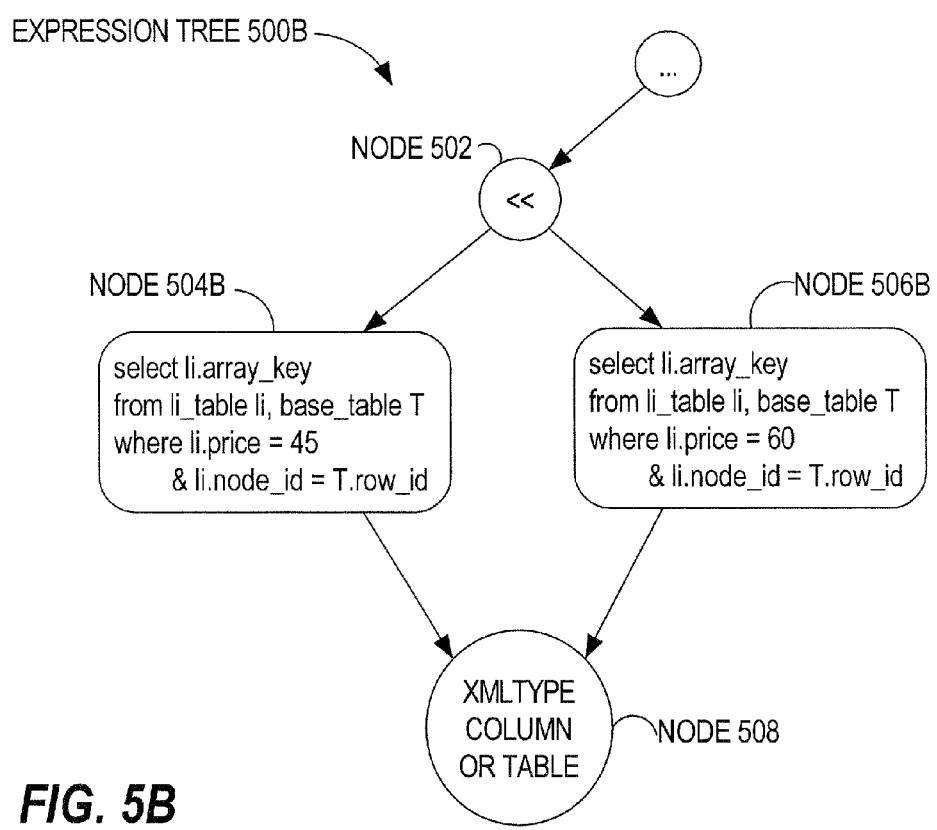

Therefore, as depicted in FIGS. 5A-B, a SET analyzer translates XQextractRef('/PO/lineItems [price=45]') into:

```
select li.array_index
from li_table li, base_table T
where li.price = 45
    & li.node_id = T.row_id;
``` and XQextractRef('/PO/lineItems [price=60]') into:

```
select li.array_index
from li_table li, base_table T
where li.price= 60
    & li.node_id = T.row_id;
```

Thus, after passing through a physical rewrite phase, rewritten expression tree 500A becomes expression tree 500B.

Lack of Physical Rewrite Optimizations

In some cases, XML data that is stored as a CLOB or as binary (e.g., CSX) data are not associated with an XML index in order to efficiently query the XML data. In such cases, the actual CLOB or binary data is typically read and analyzed. One or more nodes reflected in the XML data may include references to one or more "related" (e.g., parent, child, or sibling) nodes. For example, a particular node reflected in XML data stored as CSX data may include pointers (i.e., references) to a parent, child, and/or siblings of the particular node. A pointer is a CSX locator value that is used to identify an address in disk storage where each "related" node is stored. Such pointers may be used in executing the SQL/XML query.

However, typically, no nodes reflected in XML data include references to "related" nodes. In that case, in one embodiment, a tree of nodes is generated as the XML data is read from storage. As the tree of nodes is generated, a unique reference (e.g., a preorder traversal value) is associated with each node. In executing the SQL/XML query, the tree of nodes is traversed in order to identify certain nodes. Then, the references associated with the identified nodes may be used for comparison purposes.

Hardware Overview

Figure 6:
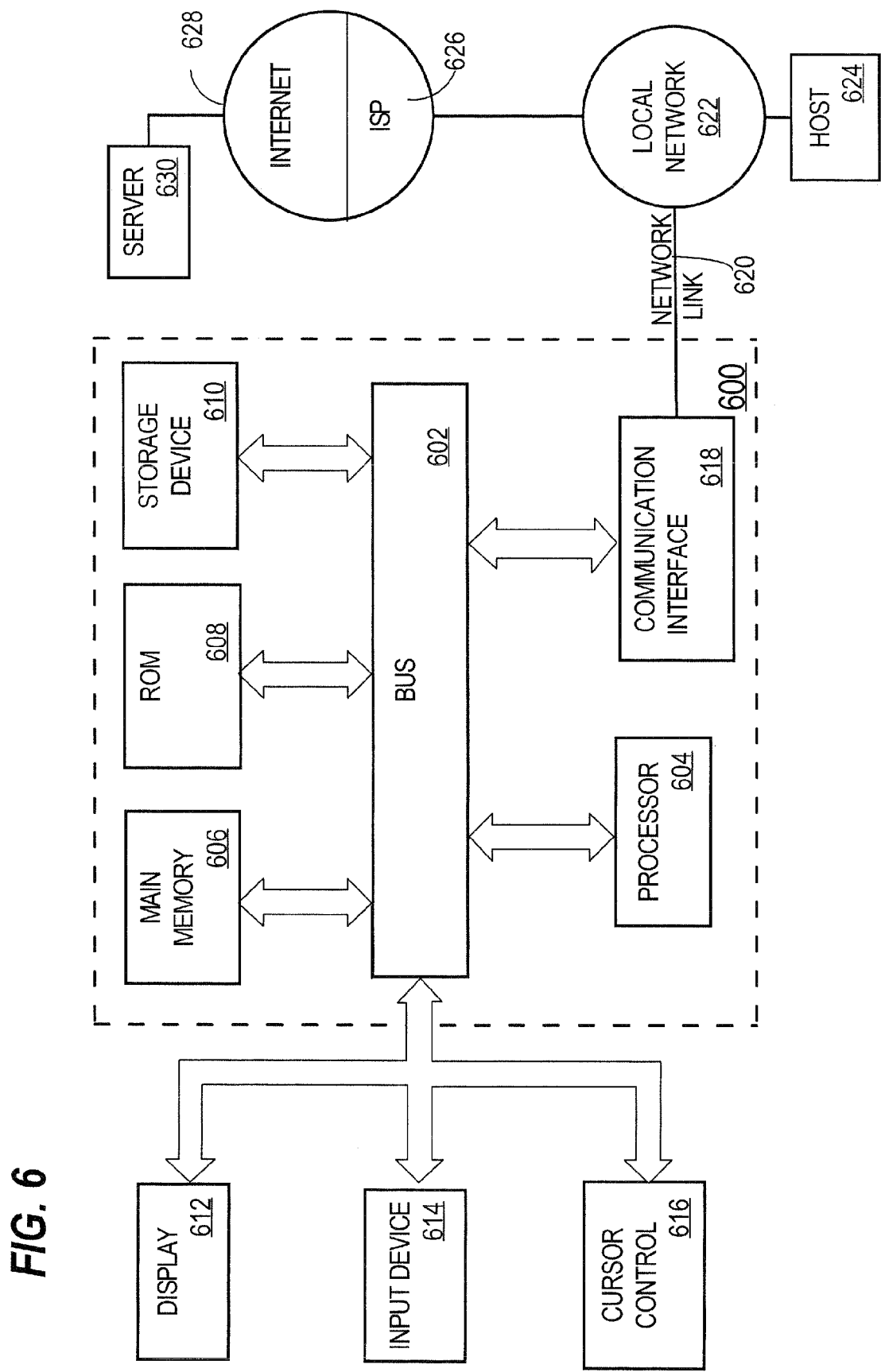
FIG. 6 is a block diagram that depicts a computer system upon which an embodiment of the invention may be implemented.

FIG. 6 is a block diagram that depicts a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a first query that conforms to a first XML query language;
   determining that an operator included in the first query requires one or more node references, to one or more nodes, as operands of the operator instead of a value of any of the one or more nodes;
   wherein the operator included in the first query is one of a node comparison operator or an operator that requires context node traversal; and
   in response to determining that the operator included in the first query requires one or more node references as operands of the operator, generating, based on the first query, a second query (a) that conforms to a second XML query language that is different than the first XML query language and (b) that includes a particular operator not included in the first query;
   wherein execution of the particular operator included in the second query causes a reference, to a node in an XML document, to be returned instead of a value of the node;
   wherein the steps are performed by one or more computing devices.

2. The method of claim 1, wherein the first XML query language is an XQuery query language.

3. The method of claim 1, wherein the second XML query language is an SQL/XML query language.

4. The method of claim 1, further comprising:
   determining how XML data, that is targeted by the first query, can be accessed;
   generating, based on the second query and how the XML data can be accessed, a third query that indicates one or more data structures; and
   executing the third query, wherein the one or more data structures are accessed to execute the third query.

5. The method of claim 4, wherein:
   determining how the XML data can be accessed includes determining that an XML index exists on the XML data; and
   the one or more data structures are one or more data structures of the XML index.

6. The method of claim 4, wherein:
   determining how the XML data can be accessed includes determining that the XML data is stored object-relationally; and
   the one or more data structures are one or more object-relational data structures.

7. The method of claim 1, wherein the particular operator takes a path expression as input.

8. A method comprising:
   executing an SQL/XML query that includes a reference-based operator, wherein the reference-based operator includes a set of one or more operands that each refer to one or more nodes of an XML document, wherein the reference-based operator is one of a node comparison operator or an operator that requires context node traversal;
   wherein execution of the reference-based operator returns a reference to the one or more nodes instead of a value of the one or more nodes;
   wherein executing the SQL/XML query includes:
      determining a reference for each of the one or more nodes; and
      generating results of the SQL/XML query based on the-reference;
   wherein the steps are performed by one or more computing devices.

9. The method of claim 8, wherein the SQL/XML query is generated from compiling an XQuery query that is received by a database server.

10. The method of claim 8, wherein before executing the SQL/XML query, the method further comprises:
    determining how XML data, that is targeted by the SQL/XML query, can be accessed;
    generating, based on the SQL/XML query and how the XML data can be accessed, a rewritten query that indicates one or more data structures; and
    executing the rewritten query, wherein the one or more data structures are accessed to execute the rewritten query.

11. The method of claim 10, wherein:
    determining how the XML data can be accessed includes determining that an XML index exists on the XML data; and
    the one or more data structures are one or more data structures of the XML index.

12. The method of claim 10, wherein:
    determining how the XML data can be accessed includes determining that the XML data is stored object-relationally; and
    the one or more data structures are one or more object-relational data structures.

13. A machine-readable storage medium storing instructions which, when executed by one or more processors, causes:
    receiving a first query that conforms to a first XML query language;
    determining that an operator included in the first query requires one or more node references, to one or more nodes, as operands of the operator instead of a value of any of the one or more nodes;
    wherein the operator included in the first query is one of a node comparison operator or an operator that requires context node traversal; and
    in response to determining that the operator included in the first query requires one or more node references as operands of the operator, generating, based on the first query, a second query (a) that conforms to a second XML query language that is different than the first XML query language and (b) that includes a particular operator not included in the first query;
    wherein execution of the particular operator included in the second query causes a reference, to a node in an XML document, to be returned instead of a value of the node.

14. The machine-readable storage medium of claim 13, wherein the first XML query language is an XQuery query language.

15. The machine-readable storage medium of claim 13, wherein the second XML query language is an SQL/XML query language.

16. The machine-readable storage medium of claim 13, wherein the instructions, when executed by the one or more processors, further cause the one or more processors to perform the steps of:

determining how XML data, that is targeted by the first query, can be accessed;

generating, based on the second query and how the XML data can be accessed, a third query that indicates one or more data structures; and executing the third query, wherein the one or more data structures are accessed to execute the third query.

17. The machine-readable storage medium of claim 16, wherein:

determining how the XML data can be accessed includes determining that an XML index exists on the XML data; and the one or more data structures are one or more data structures of the XML index.

18. The machine-readable storage medium of claim 16, wherein:

determining how the XML data can be accessed includes determining that the XML data is stored object-relationally; and the one or more data structures are one or more object-relational data structures.

19. The machine-readable storage medium of claim 13, wherein the particular operator takes a path expression as input.

20. A machine-readable storage medium storing instructions which, when executed by one or more processors, cause:

executing an SQL/XML query that includes a reference-based operator, wherein the reference-based operator includes a set of one or more operands that each refer to one or more nodes of an XML document, wherein the reference-based operator is one of a node comparison operator or an operator that requires context node traversal;

wherein execution of the reference-based operator returns a reference to the one or more nodes instead of a value of the one or more nodes;

wherein executing the SQL/XML query includes:

determining a reference for each of the one or more nodes; and generating results of the SQL/XML query based on the reference.

21. The machine-readable storage medium of claim 20, wherein the SQL/XML query is generated from compiling an XQuery query that is received by a database server.

22. The machine-readable storage medium of claim 20, wherein the instructions, when executed by the one or more processors, further cause the one or more processors to perform the step of, before executing the SQL/XML query:

determining how XML data, that is targeted by the SQL/XML query, can be accessed;

generating, based on the SQL/XML query and how the XML data can be accessed, a rewritten query that indicates one or more data structures; and executing the rewritten query, wherein the one or more data structures are accessed to execute the rewritten query.

23. The machine-readable storage medium of claim 22, wherein:

determining how the XML data can be accessed includes determining that an XML index exists on the XML data; and the one or more data structures are one or more data structures of the XML index.

24. The machine-readable storage medium of claim 22, wherein:

determining how the XML data can be accessed includes determining that the XML data is stored object-relationally; and the one or more data structures are one or more object-relational data structures.

* * * * *

UNITED STATES PATENT AND TRADEMARK OFFICE
CERTIFICATE OF CORRECTION

PATENT NO. : 7,870,124 B2  
APPLICATION NO. : 11/955944  
DATED : January 11, 2011  
INVENTOR(S) : Zhen Hua Liu et al.

Page 1 of 1

It is certified that error appears in the above-identified patent and that said Letters Patent is hereby corrected as shown below:

On the Title Page Item (54), in "Title" line 2, delete "SQL/SML" and insert -- SQL/XML --, therefor.

On the Title Page Item (56), under "Other Publications", line 1, delete "XQuary" and insert -- XQuery --, therefor.

In column 1, line 2, delete "SQL/SML" and insert -- SQL/XML --, therefor.

Signed and Sealed this  
Thirteenth Day of September, 2011

David J. Kappos  
*Director of the United States Patent and Trademark Office*